United States Patent
Carlioz et al.

(10) Patent No.: US 10,800,531 B2
(45) Date of Patent: Oct. 13, 2020

(54) PASSENGER ACCOMMODATION SYSTEMS INCLUDING PARTITION WALLS

(71) Applicant: Safran Seats USA LLC, Gainesville, TX (US)

(72) Inventors: Victor Carlioz, Newport Beach, CA (US); Hugo Jamson, London (GB); Lito Karatsoli, Jersey City, NJ (US); Luke Miles, London (GB)

(73) Assignee: Safran Seats USA LLC, Gainesville, TX (US)

( * ) Notice: Subject to any disclaimer, the term of this patent is extended or adjusted under 35 U.S.C. 154(b) by 346 days.

(21) Appl. No.: 15/554,160

(22) PCT Filed: Apr. 4, 2016

(86) PCT No.: PCT/US2016/025833
§ 371 (c)(1),
(2) Date: Aug. 28, 2017

(87) PCT Pub. No.: WO2016/164293
PCT Pub. Date: Oct. 13, 2016

(65) Prior Publication Data
US 2018/0265201 A1 Sep. 20, 2018

Related U.S. Application Data

(60) Provisional application No. 62/144,757, filed on Apr. 8, 2015, provisional application No. 62/144,737, filed
(Continued)

(51) Int. Cl.
B64D 11/06 (2006.01)
B64D 11/04 (2006.01)
(Continued)

(52) U.S. Cl.
CPC ...... *B64D 11/0601* (2014.12); *B64D 11/0007* (2013.01); *B64D 11/0023* (2013.01);
(Continued)

(58) Field of Classification Search
CPC . B64D 11/0007; B64D 11/0023; B64D 11/04; B64D 11/0601; B64D 11/0606; B64C 2001/0018; B64C 2001/0027
See application file for complete search history.

(56) References Cited

U.S. PATENT DOCUMENTS 3,168,364 A * 2/1965 Schaefer-Sell ......... A47B 31/02
312/297
4,022,404 A * 5/1977 Greiss ................ B64D 11/0007
244/118.5
(Continued)

FOREIGN PATENT DOCUMENTS

CN 1681706 A 10/2005
CN 1950256 A 4/2007
(Continued)

OTHER PUBLICATIONS

International Patent Application No. PCT/US2016/025833, Invitation to Pay Additional Fees and, Where Applicable, Protest Fee and Partial Search Report, dated Jul. 8, 2016.
(Continued)

*Primary Examiner* — Nicholas McFall
(74) *Attorney, Agent, or Firm* — Kilpatrick Townsend & Stockton LLP

(57) ABSTRACT

Passenger accommodation systems are described. An example passenger accommodation system can be disposed in an aircraft and can include a passenger seating deck, a plurality of passenger seats disposed within the passenger seating deck, and a partition wall disposed within the passenger seating deck so as to separate the plurality of
(Continued)

passenger seats into a first set of passenger seats and a second set of passenger seats. The partition wall can be aligned with a longitudinal axis extending in the direction of travel of the aircraft. Movement of passengers between the first set of seats and the second set of seats may not impeded by the partition wall.

21 Claims, 10 Drawing Sheets

Related U.S. Application Data on Apr. 8, 2015, provisional application No. 62/144,728, filed on Apr. 8, 2015.

(51) Int. Cl.
*B64D 11/00* (2006.01)
*B64C 1/00* (2006.01)

(52) U.S. Cl.
CPC ......... *B64D 11/04* (2013.01); *B64D 11/0606* (2014.12); *B64C 2001/0018* (2013.01); *B64C 2001/0027* (2013.01); *B64D 2011/0069* (2013.01)

(56) References Cited

U.S. PATENT DOCUMENTS

| | | | |
|---|---|---|---|
| 4,597,549 A | 7/1986 | Ryan | |
| 6,152,400 A | 11/2000 | Sankrithi et al. | |
| 6,761,332 B1 | 7/2004 | Bengtsson | |
| 7,159,821 B2 | 1/2007 | Harrington et al. | |
| 7,823,831 B2 * | 11/2010 | Guering | B64D 11/0601 105/316 |
| 2004/0217234 A1 | 11/2004 | Jones et al. | |
| 2005/0167546 A1 | 8/2005 | Jones et al. | |
| 2006/0145002 A1 | 7/2006 | Van Loon | |
| 2006/0214057 A1 | 9/2006 | Saint-Jalmes et al. | |
| 2007/0102577 A1 | 5/2007 | Saint-Jalmes et al. | |
| 2007/0102579 A1 | 5/2007 | Krieglsteiner et al. | |
| 2007/0170311 A1 | 7/2007 | Schuld et al. | |
| 2012/0318822 A1 * | 12/2012 | Strauss | B67D 1/04 222/129.1 |
| 2013/0105627 A1 | 5/2013 | Orson et al. | |
| 2013/0187000 A1 * | 7/2013 | Godecker | B64D 11/04 244/118.5 |
| 2014/0300152 A1 | 10/2014 | Park et al. | |
| 2014/0339361 A1 | 11/2014 | Moje et al. | |
| 2015/0041100 A1 | 2/2015 | Huang et al. | |

FOREIGN PATENT DOCUMENTS

| | | |
|---|---|---|
| CN | 101014496 A | 8/2007 |
| CN | 101595030 A | 12/2009 |
| CN | 101925514 A | 12/2010 |
| CN | 103183127 A | 7/2013 |
| CN | 104302546 A | 1/2015 |
| DE | 102006003585 | 8/2007 |
| DE | 102007009500 | 8/2008 |
| EP | 0901963 | 3/1999 |
| FR | 2873349 | 1/2006 |
| FR | 2886896 | 12/2006 |
| JP | 2006053900 A | 2/2006 |
| JP | 2007260200 A | 10/2007 |
| JP | 2008507448 A | 3/2008 |
| JP | 2012500744 A | 1/2012 |
| JP | 2012165828 A | 9/2012 |
| JP | 2014520728 A | 8/2014 |
| WO | 9835876 A1 | 8/1998 |
| WO | 2006021646 A1 | 3/2006 |
| WO | 2010021594 | 2/2010 |
| WO | 2010021594 A1 | 2/2010 |
| WO | 2013067021 A1 | 5/2013 |
| WO | 2013136283 | 9/2013 |
| WO | 2014125046 A1 | 8/2014 |

OTHER PUBLICATIONS

International Patent Application No. PCT/US2016/025833, Search Report and Written Opinion, dated Oct. 31, 2016.
Japan Patent Application No. 2017-550724, Office Action, dated Feb. 25, 2020.
China Patent Application No. 201680020279.7, Office Action and Search Report, dated May 12, 2020.

* cited by examiner

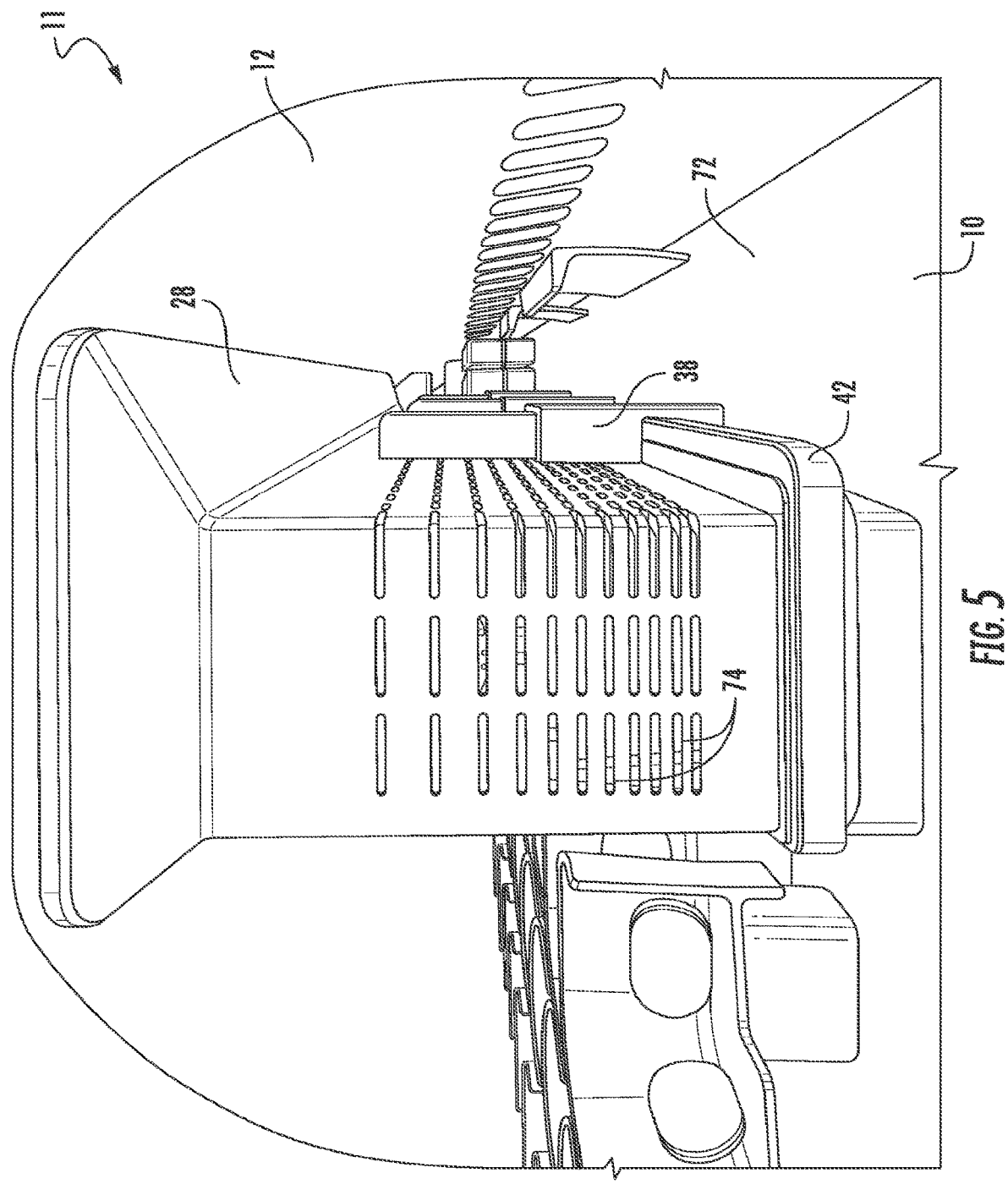

PASSENGER ACCOMMODATION SYSTEMS INCLUDING PARTITION WALLS

CROSS REFERENCE TO RELATED APPLICATIONS

This patent application is the U.S. national stage entry of PCT/US2016/025833 ("the '833 application"), filed on Apr. 4, 2016, which application is related to and claims priority benefits from U.S. Provisional Application Ser. No. 62/144,728 ("the '728 application"), filed on Apr. 8, 2015, entitled "Lower Deck Crown Berths", U.S. Provisional Application Ser. No. 62/144,737 ("the '737 application"), filed on Apr. 8, 2015, entitled "Cabin Service Points," and U.S. Provisional Application Ser. No. 62/144,757 ("the '757 application"), filed on Apr. 8, 2015, entitled "Cabin Spine." Each of the '833 application, the '728 application, the '737 application, and the '757 application is hereby incorporated in its entirety by this reference.

FIELD OF THE INVENTION

The field of the disclosure relates to passenger seats. In particular, layouts of passenger seats in passenger aircraft are provided.

BACKGROUND

Interior layouts of commercial aircraft have typically been designed to maximize space. This is especially true in economy class seating. In doing so, the numbers of passenger seats being installed length-wise in the aircraft (e.g., number of rows of seats) and across the aircraft (e.g., number of seats in each row) has resulted in dense seating arrangements. For some passengers, the mere perception of being surrounded by passengers in all directions that results from such dense seating arrangements can be overwhelming.

SUMMARY

Embodiments covered by this disclosure are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain examples, a passenger accommodation system is provided. The passenger accommodation system can include a passenger seating deck and a passenger resting deck. The passenger seating deck can be disposed within a fuselage of an aircraft. The passenger seating deck can include a passenger seating area and one or more common areas, and the fuselage can have a longitudinal axis extending in the direction of travel of the aircraft. The passenger seating deck can also include a plurality of passenger seats disposed within the passenger seating deck in the passenger seating area. The plurality of passenger seats can be arranged in a set of rows and a set of columns, and at least some columns of the set of columns can be aligned with the longitudinal axis. The passenger seating deck can also include a partition wall disposed within the passenger seating deck and extending between the plurality of passenger seats to define a first passenger seating subarea and a second passenger seating subarea. The passenger seating deck can also include one or more service anchors disposed within the one or more common areas, each service anchor configured to releasably secure a moveable service cart. The moveable service cart can include a deployable structure that is configured to move from a stowed position within the moveable service cart to a deployed position outside of the moveable service cart. The passenger seating deck can also include a deployable galley system disposed within one of the one or more common areas, the deployable galley system comprising one or more galley cabinets each configured to move in a direction orthogonal to the longitudinal direction between a stowed position and a deployed position. The passenger resting deck can be disposed within the fuselage at a location above the passenger seating deck. The passenger resting deck can include an access aisle aligned with the longitudinal axis and a plurality of resting compartments. Individual resting compartments of the plurality of resting compartments can be aligned with an oblique angle relative to the longitudinal axis. Each resting compartment can include a resting surface and a set of dividers extending between the resting surface and an upper portion of the fuselage.

According to certain examples, a passenger accommodation system is provided. The system can include a passenger seating deck, a plurality of passenger seats, and a partition wall. The passenger seating deck can be disposed within a fuselage of an aircraft. The passenger seating deck can be defined by a floor and a ceiling. The fuselage has a longitudinal axis extending in the direction of travel of the aircraft. The plurality of passenger seats can be disposed within the passenger seating deck. The plurality of passenger seats can be arranged in a set of rows and a set of columns, and at least some columns of the set of columns can be aligned with the longitudinal axis. The partition wall can be disposed within the passenger seating deck to define a first area and a second area. A set of passenger seats of the plurality of passenger seats can be disposed within at least the first area. The system can also include a first passenger aisle disposed within the first area and a second passenger aisle disposed within the second area. Passengers of the aircraft can move between the first area and the second area using at least one of the first passenger aisle or the second passenger aisle.

In some examples, the partition wall can include a curved portion and a straight portion, and the straight portion can be aligned with the longitudinal axis and the curved portion can curve relative to the longitudinal axis.

In some examples, the set of passenger seats can be a first set of passenger seats. A second set of passenger seats of the plurality of passenger seats can be disposed within the second area.

In some examples, the second passenger aisle can be defined by the partition wall on a first side and the fuselage on a second side.

In some examples, the system can further include a passenger resting deck disposed within the fuselage of the aircraft at a position above the passenger seating deck.

In some examples, the passenger resting deck can include an access aisle extending along the longitudinal axis and a plurality of resting compartments. Individual resting compartments of the plurality of resting compartments can be aligned with an oblique angle relative to the longitudinal axis. Each resting compartment can also include a resting surface and a set of dividers extending between the resting surface and an upper portion of the fuselage.

In some examples, the passenger resting deck can be a first passenger resting deck. The passenger accommodation system can also include a second passenger resting deck disposed within the fuselage of the aircraft at a position below the passenger seating deck.

In some examples, the system can include a passenger resting deck disposed within the fuselage of the aircraft at a position below the passenger seating deck. The passenger resting deck can include an access aisle extending along the longitudinal axis and a plurality of resting compartments each extending in a direction orthogonal to the longitudinal axis.

According to certain examples, an aircraft is provided. The aircraft can include a passenger seating deck, a plurality of passenger seats, and a partition wall. The passenger seating deck can be disposed within a fuselage of the aircraft. The fuselage can have a longitudinal axis extending in the direction of travel of the aircraft. The plurality of passenger seats can be disposed within the passenger seating deck. The plurality of passenger seats can be arranged in a set of rows and a set of columns, at least some columns of the set of columns can be aligned with the longitudinal axis. The partition wall can be disposed within the passenger seating deck to separate a first set of passenger seats of the plurality of passenger seats and a second set of passenger seats of the plurality of passenger seats. In some examples, at least a portion of the partition wall aligned with the longitudinal axis. Passengers of the aircraft can move between the first set of passenger seats and the second set of passenger seats.

In some examples, the portion of the partition wall is a first portion. The partition wall can further include a second portion that extends in a direction orthogonal to the longitudinal axis and a third portion that curvedly attaches the first portion and the second portion.

In some examples, the aircraft can further include a passenger resting deck disposed within the fuselage of the aircraft at a position below the passenger seating deck. The passenger resting deck can include an access aisle extending along the longitudinal axis and a plurality of resting compartments each extending in a direction orthogonal to the longitudinal axis.

In some examples, the passenger seating deck can be defined by a floor and a ceiling. The partition wall can extend between the wall and the ceiling.

In some examples, the partition wall can be a first partition wall. The aircraft can also include a second partition wall disposed within the passenger seating deck to separate a passenger access corridor and the second set of passenger seats.

In some examples, the partition wall can include one or more openings.

According to certain examples, a passenger accommodation assembly is provided. The passenger accommodation assembly can include a passenger seating deck, a plurality of passenger seats, and one or more service anchors. The passenger seating deck can be disposed within a fuselage of an aircraft. The passenger seating deck can include a seating area and one or more common areas. The plurality of passenger seats can be disposed within the seating area of the passenger seating deck. The one or more service anchors can be disposed within the one or more common areas. Each service anchor can be configured to releasably secure a moveable service cart. The moveable service cart can include a deployable structure that is configured to move from a stowed position within the moveable service cart to a deployed position outside of the moveable service cart.

In some examples, the system can further include a plurality of fixed service columns disposed within the seating area and among the plurality of passenger seats.

In some examples, the plurality of fixed service columns can extend between a floor of the passenger seating deck and a ceiling of the passenger seating deck.

In some examples, at least one fixed service column of the plurality of fixed service columns can include one or more compartments dimensioned to receive items that are available for use by the passengers or are available for purchase by the passengers.

In some examples, the deployable structure of the moveable service cart can include one or more compartments that are accessible in the deployed position and inaccessible in the stowed position.

In some examples, the system can further include a deployable galley system disposed in at least one of the one or more common areas.

In some examples, the deployable galley system can include one or more galley cabinets each configured to move in a direction orthogonal to the longitudinal direction between a stowed position and a deployed position.

BRIEF DESCRIPTION OF THE DRAWINGS

FIG. 5 shows a front perspective view of at least one example of a passenger seating deck.

DETAILED DESCRIPTION

Figure 1:
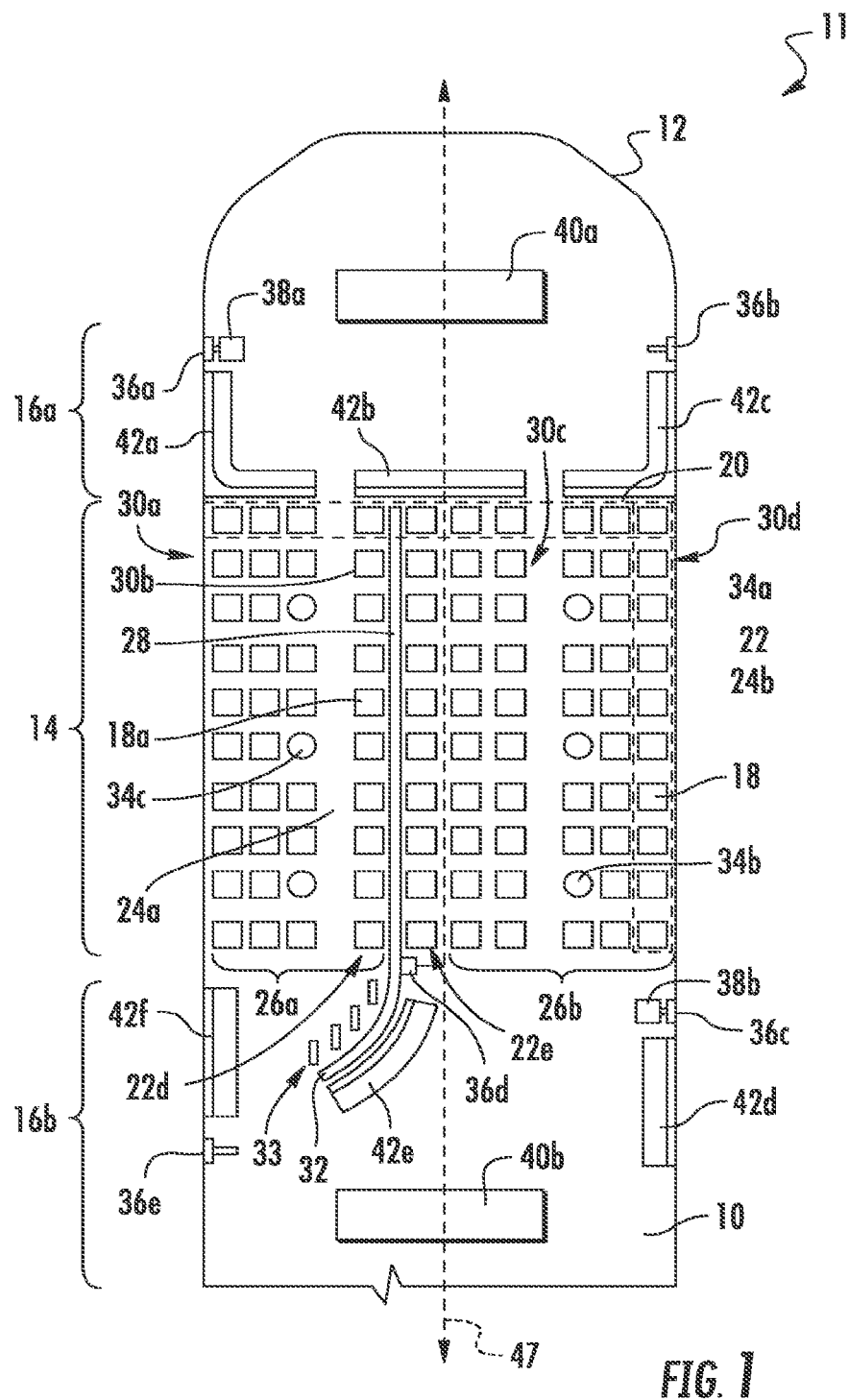
FIG. 1 shows a plan view of at least one example of a passenger seating deck of a fuselage of a passenger aircraft.

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. The subject matter of embodiments of the present description is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide various passenger accommodation systems within fuselages of passenger aircrafts. While the passenger accommodation systems are discussed for use with passenger aircraft, they are by no means so limited. Rather, embodiments of the passenger accommodation systems may be used in passenger vehicles or other vehicles of any type or otherwise as desired.

Embodiments described herein provide passenger accommodation systems for accommodating aspects of passengers' time spent in a passenger aircraft. For example, passenger accommodation systems can include multiple decks, with individual decks arranged in accordance with the systems described herein. For example, a passenger resting deck can include a set of resting compartments disposed above and/or below a passenger deck. The passenger deck can include a passenger seating area and a common area. The passenger seating area can be portioned using a partition wall to create passenger seating subareas. The partition wall can be aligned with an axis extending in a longitudinal axis in the direction of travel of the passenger aircraft. Passengers may freely move between the subareas despite the partition wall. Service columns (sometimes referred to as service totems) can be disposed throughout the passenger seating area (e.g., in place of one or more seats). These service columns can store self-service items available to the passengers. The common areas can include service anchor locations for receiving moveable service carts. The moveable service carts can be docked at the service anchor locations during flight. Like the service columns, the moveable service carts can include self-service items available to the passengers. The moveable service carts can be deployable for easy stowage during takeoff and landing. The common areas can also include a deployable galley system. An example deployable galley system can include galley cabinets that move vertically between stowed and deployed positions. When in the stowed positions, the deployable galley system can provide improved access to flat surfaces by passengers and flight crew.

Turning now to the figures, FIG. 1 illustrates a plan view of at least one example of a passenger seating deck 10 of a fuselage 12 of a passenger aircraft 11. A passenger accommodation system may be implemented to include the elements of the passenger seating deck 10. The passenger seating deck 10 generally includes at least one passenger seating area 14 and at least one common area 16. The common area 16 may be an aft common area 16a and/or a forward common area 16b. In the passenger seating area 14 is disposed passenger seats 18 arranged in a series of rows 20 and a series of columns 22. Two or more longitudinal passenger aisles 24 are shown in the passenger seating area 14. The passenger aisles 24 can be aligned with a longitudinal axis 47, which runs parallel to the direction of travel of the passenger aircraft 11. The passenger aisles 24 allow passengers to move forward and aft in the aircraft (e.g., lengthwise to access the common areas 16) and to move between passenger seating subareas 26 (e.g., lengthwise and/or widthwise).

As shown in FIG. 1, the passenger seating area 14 is partitioned into one or more passenger seating subareas 26 using a longitudinal partition wall 28. At least a portion of the partition wall 28 is shown running substantially parallel to the passenger aisles 24. The partition wall 28 is also shown having a forward curvature 32, described in more detail below. The passenger seating subareas 26 that are thus created can correspond to different classes of service (e.g., business class, economy, and the like) or subclasses of service (e.g., economy improved, business enhanced, and the like). The partition wall 28 can be installed in the passenger aircraft 11 in such a manner that passengers can still freely move between the passenger seating subarea 26a and the passenger seating subarea 26b. In other words, the partition wall 28 does not entirely close off the passenger seating subareas 26 from each other or the passenger seating area 14 from other passenger seating areas and/or common areas.

In a particular illustrative example, the fuselage 12 can be a fuselage of a wide-body aircraft (e.g., 200-240 inches in diameter). The passenger seating area 14 can be arranged for economy class seating in the wide-body aircraft. In some examples, the fuselage 12 is narrower than a wide-body aircraft. In the illustrative example, the passenger seating area 14 includes a ten-across layout in which the rows 20 are aligned in a 3×4×3 seating arrangement (e.g., a first set of three seats on the left, a first aisle, a set of four seats in the middle, a second aisle, and a second set of three seats on the right).

In the example illustrated in FIG. 1, the partition wall 28 is installed just off center of the fuselage 12 to intersect the rows 20 typically aligned in the 3×4×3 seating arrangement to create a ten-across layout in which the rows 20 are aligned in a 3×1×3×3 seating arrangement (e.g., a first set of three seats 30a, the first passenger aisle 24a, a single seat 30b, the partition wall 28, a second set of three seats 30c, the second passenger aisle 24b, and a second set of three seats 30d). The seats 30 are examples of the passenger seats 18. As described herein, the partition wall 28 can be installed in any suitable location in the fuselage 12. The partition wall 28 can divide up any suitable seating arrangement in addition to the example currently discussed.

In some examples, partitioning the passenger seating area 14 in the manner shown in FIG. 1 or otherwise described herein may provide for an improved passenger experience. The perception of being surrounded by passengers is reduced for all passengers. For example, because of the placement of the partition wall 28, the passengers in the passenger seating subareas 26 are surrounded by fewer passengers than in a typical arrangement that excludes the partition wall 28. This may be especially true for those passengers that are seated in row 22d of passenger seating subarea 26a which is adjacent the partition wall 28. Because the seats in the row 22d and row 22e are adjacent the partition wall 28, the passengers in these seats can use the partition wall 28 to lean against, which can improve passenger comfort. In some examples, an operator of the aircraft may be able to charge a premium price for these seats next to the partition wall 28. Similarly, the prices for seats in the passenger seating subarea 26A may be greater than the prices for seats in the passenger seating subarea 26B because of the presence of fewer passengers in the passenger seating subarea 26A.

As described herein, the partition wall 28 can extend from the passenger seating area 14 into one or more of the common areas 16 and can include any suitable number of curved sections, bending sections, straight sections, and the like. For example, the partition wall 28 can curvedly extend into the forward common area 16b. Thus, in the example illustrated in FIG. 1, the partition wall 28 includes the forward curve 32. The partition wall 28 can be constructed in a manner that enables it to support a staircase 33 or other loadbearing items. For example, the partition wall 28 can structurally tie to the floor of the passenger seating deck 10 and/or the ceiling of the passenger seating deck 10. The staircase 33 can be disposed primarily in one or more of the common areas 16 and can be used by passenger to access other decks (e.g., a passenger resting deck).

As illustrated, within the passenger seating area 14 is disposed one or more service columns 34 (illustrated as circles). In some examples, the service columns 34 are installed in the passenger seating area 14 in place of passenger seats 18. As illustrated, within the common areas 16 is disposed one or more service anchors 36. The service anchors 36 are located in certain areas of the common areas 16 that are dedicated to self-service. The service anchors 36 can be any suitable structure or mechanism configured to releasably secure one or more moveable service carts 38 during flight. Examples of the service anchors 36 include, but are not limited to: belts attached to a wall of the fuselage 12 and configured to releasably couple with a moveable service cart 38, a latching mechanism disposed on the floor of the passenger seating deck 10 or attached to a wall of the fuselage 12 and configured to releasably couple with the moveable service cart 38, one or more magnets disposed on the floor of the passenger seating deck 10 or attached to a wall of the fuselage 12 and configured to releasably couple with one or more other magnets of the moveable service cart 38, any combination of the foregoing, and any other suitable structure or mechanism.

In practice, the moveable service carts 38 can be stowed at dedicated stowage locations during taxi, takeoff, and landing. For example, such dedicated stowage locations can be within a galley 40. During flight, flight crew can move the moveable service carts 38 from the dedicate stowage locations to the dedicated areas in the common areas 16 where the service anchors 36 are located. The flight crew can also couple the moveable service carts 38 to the fuselage 12 using the service anchors 36. For example, the moveable service cart 38a is shown coupled to the service anchor 36a. The service anchor 36b does not currently have its own moveable service cart 38 coupled thereto.

As introduced previously, the common areas 16 can include the galleys 40. In some examples, the galleys 40 include deployable galley systems as described herein.

Figure 2:
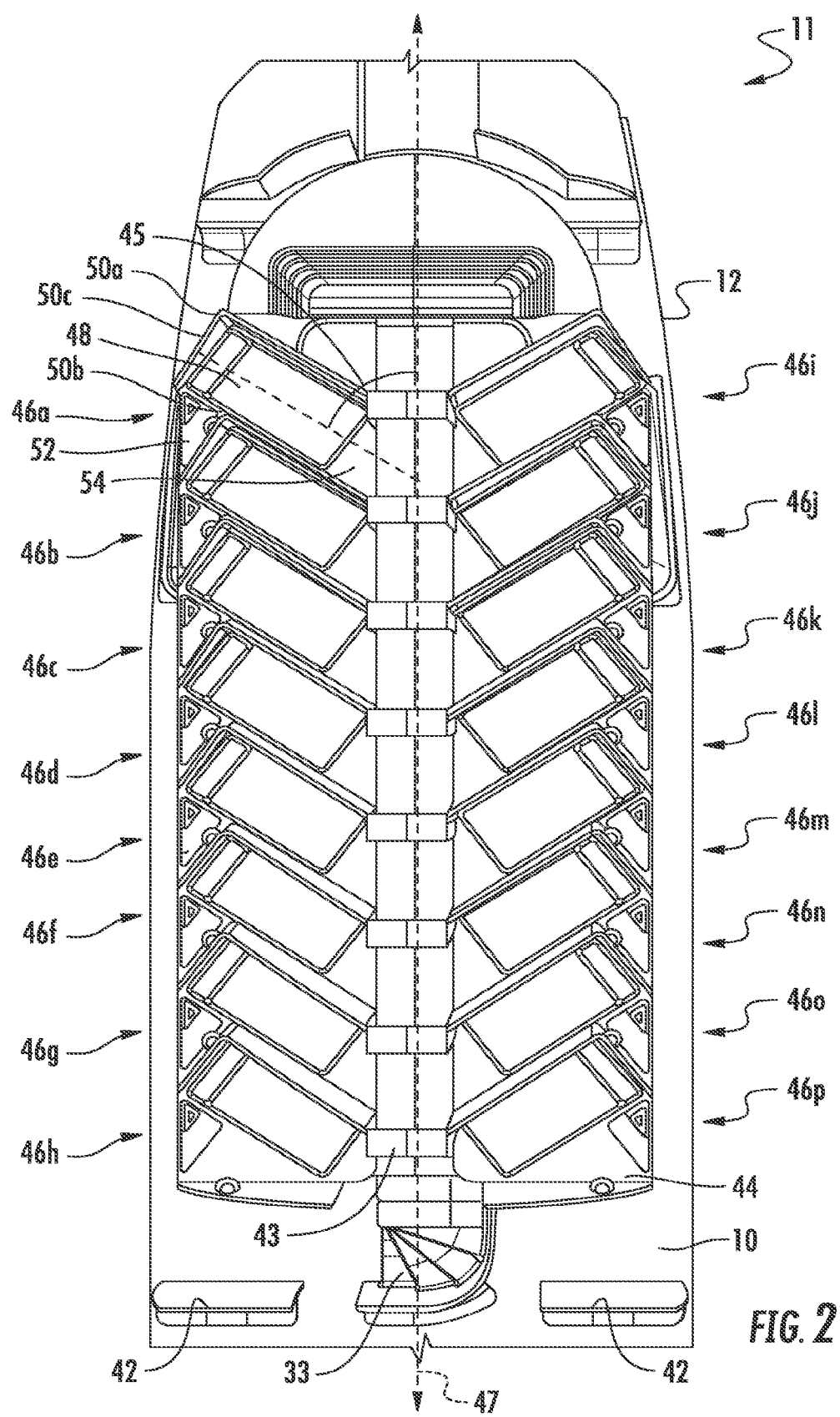
FIG. 2 shows a plan view of at least one example of a passenger resting deck of the fuselage of the passenger aircraft of FIG. 1.

FIG. 2 illustrates a plan view of at least one example of a passenger resting deck 44 of the fuselage 12 of the passenger aircraft 11. The passenger resting deck 44 is disposed above the passenger seating deck 10, a portion of which is illustrated in FIG. 2 and as shown in the cross-sectional views of FIGS. 3 and 4. The passenger resting deck 44 includes an access aisle 43 and a plurality of passenger resting compartments 46. The passenger resting deck 44 cam be accessible via the staircase 33. Each passenger resting compartment 46 (as discussed with reference to the passenger resting compartment 46a) includes a resting surface 48 and expansion area 52 disposed between two or more dividers or walls 50. The resting surface 48 can include any suitable combination of cushions, mattresses, pillows, and the like to provide a comfortable resting experience for passengers.

In some examples, the resting surface 48 can move from an upright position to a reclined position. The expansion area 52 can also include cushions, pillows, and the like, which may provide passengers with additional room for stretching out their arms. In some examples, the expansion area 52 also includes an eating surface and/or structure for food or entertainment items. For example, the expansion area 52 can include a tray table, which may be deployable to a position that is above at least a portion of the resting surface 48. In some examples, the expansion area 52 can include one or more personal entertainment systems (e.g., audio and/or video) and/or ports, plugs, and the like for charging personal electronic devices. The expansion area 52 can also include space to receive and/or store small passenger items (e.g., clothing, small carry bag, etc.). In some examples, the expansion area 52 can be separated from the resting surface 48 by a door. In this manner, the expansion area 52 can function as closet. In other examples, the expansion area 52 smoothly transitions to the resting surface 48.

The dividers 50 can function to divide one passenger resting compartment 46 from another. In some examples, the dividers 50 extend from the resting surface 48 to a top portion of the fuselage 12 or other ceiling of the passenger resting deck 44. In this manner, the dividers 50 can function to enclose off at least two sides of the passenger resting compartment 46. The passenger resting compartment 46 also includes an access area 54. Through the access areas 54, passengers access the passenger resting compartments 46. In some examples, the access areas 54 include doors that can be open and shut. In some examples, the access areas 54 can include accordion doors, folding doors, curtains, or any other suitable structure that increases privacy above an unobstructed opening. In this manner, the passenger resting compartments 46 may provide of privacy for the passengers.

The passenger resting compartments 46 can be disposed in the passenger resting deck 44 in a manner that seeks to optimize space within the fuselage 12. For example, the passenger resting compartments 46 can be aligned with an oblique angle 45 relative to the longitudinal axis 47 of the fuselage 12. In some examples, the dimension of the oblique angle 45 is between 30 and 80 degrees. In some examples, the dimension is about 60 degrees. The dimension of the angle 45 may depend on the width of the passenger resting deck 44, which depends on the elevation of the elements of the passenger resting deck 44 in the fuselage 12. In some examples, the angle 45 may vary depending on the size of the passenger resting compartments 46 and their location along the longitudinal axis 47. For example, the fuselage 12 may taper near the aft portion, which may result in the angle 45 being sharper, while in wider portions of the fuselage the angle 45 may be less sharp. The arrangement of the passenger resting compartments 46 can correspond to a herringbone shape.

Figure 3:
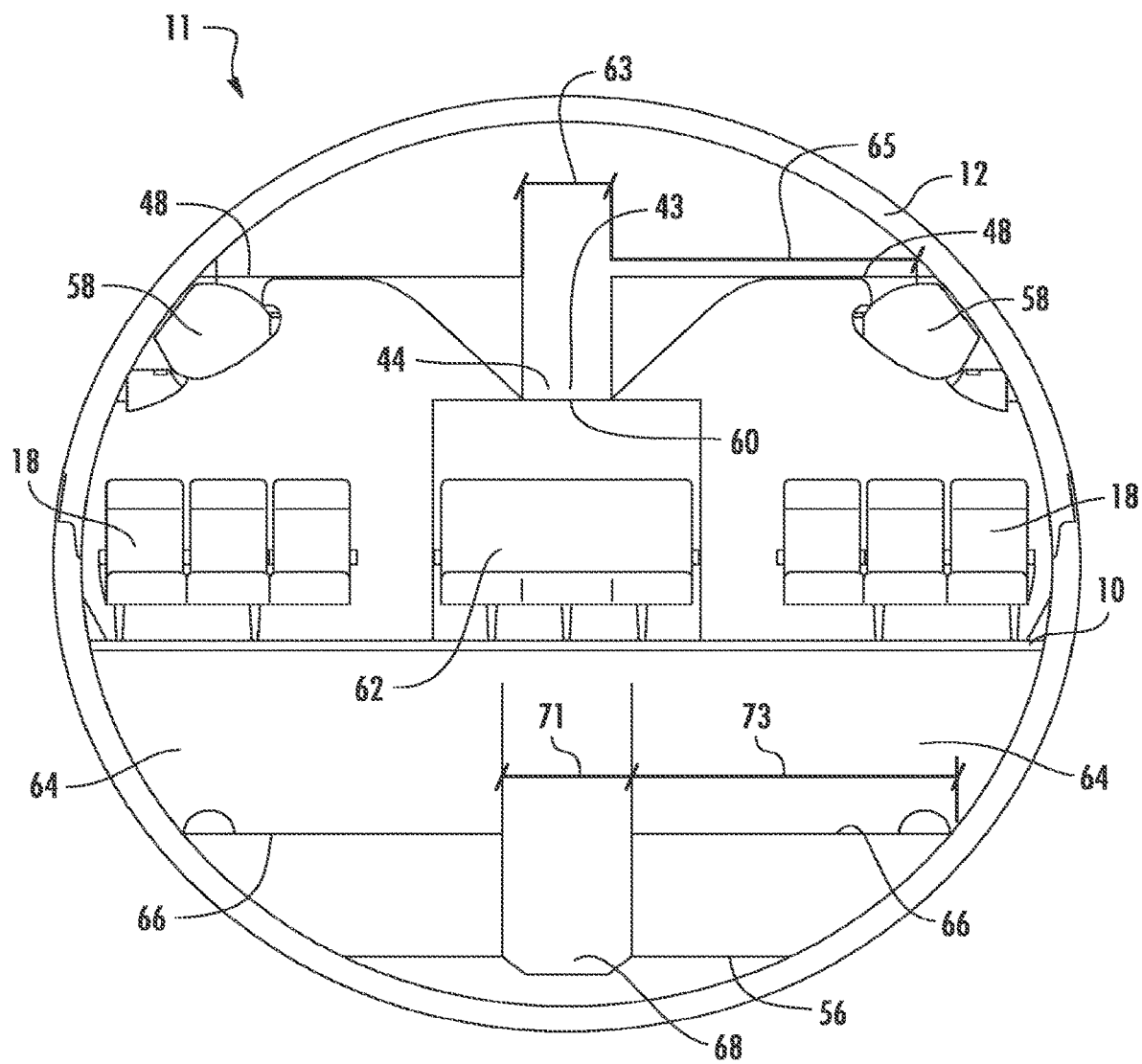
FIG. 3 shows a cross-sectional view of at least one example of the fuselage of the passenger aircraft of FIG. 1.

Returning to FIG. 1, within the common areas 16 is also be disposed common or shared seats 42. In some examples, the shared seats 42 can include seatbelts like other passenger seats 18 and can be used by certain classes of passengers at different times during the flight. For example, when the passenger resting deck 44 is provided, the shared seats 42 can be filled with passengers during taxi, takeoff, and landing who have purchased tickets to use the resting compartments 46 on the passenger resting deck 44. Once in flight, these passengers can vacate the shared seats 42 and move to the passenger resting deck 44. Once the shared seats 42 have been vacated, passengers from the passenger seating area 14 (e.g., economy class passengers) can occupy the shared seats 42. As the shared seats 42 are arranged in the passenger seating deck 10 in the common areas 16, the shared seats 42 can become locations for encouraged congregation of passengers. This may be especially desirable on long flights where passenger movement can result in an improved flight experience. In some examples, the common areas 16 can include tables and the like that surround the shared seats 42 such that passengers seated in the shared seats 42 can eat, play games, and the like while seated in the shared seats 42. For example, when passengers are in the common area 16a (e.g., perhaps seated in the shared seat 42a), they can visit the moveable service cart 38 to obtain food items, newspapers, and the like which can be enjoyed while seated in the common area 16a. During taxi, takeoff, and landing, the passengers with tickets on the passenger resting deck 44 can return to the shared seats 42 and occupy these seats during these more critical parts of the flight FIG. 3 illustrates a profile view of at least one example of the fuselage 12 of the passenger aircraft 11. The profile view includes the passenger seating deck 10 disposed between simplified views of the passenger resting deck 44 and a lower passenger resting deck 56. The passenger seating deck 10 includes the passenger seats 18 and overhead storage bins 58. In some examples, arranging the passenger aircraft 11 in the manner described herein will not affect the typical elevation of the overhead storage bins 58. However, in order to accommodate the access aisle 43, a middle portion 60 of the ceiling in the passenger seating deck 10 can be lowered in the middle over a middle bank of passenger seats 62. Thus, as illustrated, the access aisle 43 can be located at an elevation that is below the resting surfaces 48 of the passenger resting deck 44. In this manner, passengers wishing to utilize the resting surfaces 48 may need to "step up" into the passenger resting compartments 46. In some examples, the elevation of the resting surfaces 48 is about the same as the access aisle 43. In some examples, a width 63 of the access aisle 43 can be between 15-30 inches and an orthogonal distance 65 from the edge of the access aisle 43 to the edge of the fuselage 12 can be about 65-85 inches. In some examples, the width 63 of the access aisle 43 is about 20 inches and the orthogonal distance 65 is about 73 inches.

The vertical elevation of the floor of the access aisle 43 may be selected such that most passengers can walk down the access aisle 43 without having to hunch over and such that passengers in the middle bank of passenger seats 62 are not overly cramped by the middle portion 60 of the ceiling.

Additionally or alternatively, a lower passenger resting deck 46 can be provided. In some examples, the lower passenger resting deck 56 is outfitted similar to the passenger resting deck 44. In this manner, the lower passenger resting deck 56 generally includes passenger resting compartments 64, resting surfaces 66, and a lower aisle 68. In some examples, the passenger resting compartments 64 in the lower passenger resting deck 56 are aligned orthogonal to the longitudinal axis of the fuselage 12. This may be because the space associated with the lower passenger resting deck 56 can be greater than the space associated with the passenger resting deck 44. For example, a width 71 of the lower aisle 68 can be between 25 and 35 inches and an orthogonal distance 73 (which can correspond directly to the length of the resting surfaces 66) can be between 70 and 80 inches. In some examples, the width 71 is about 31 inches and the orthogonal distance 73 is about 76 inches.

Figure 4:
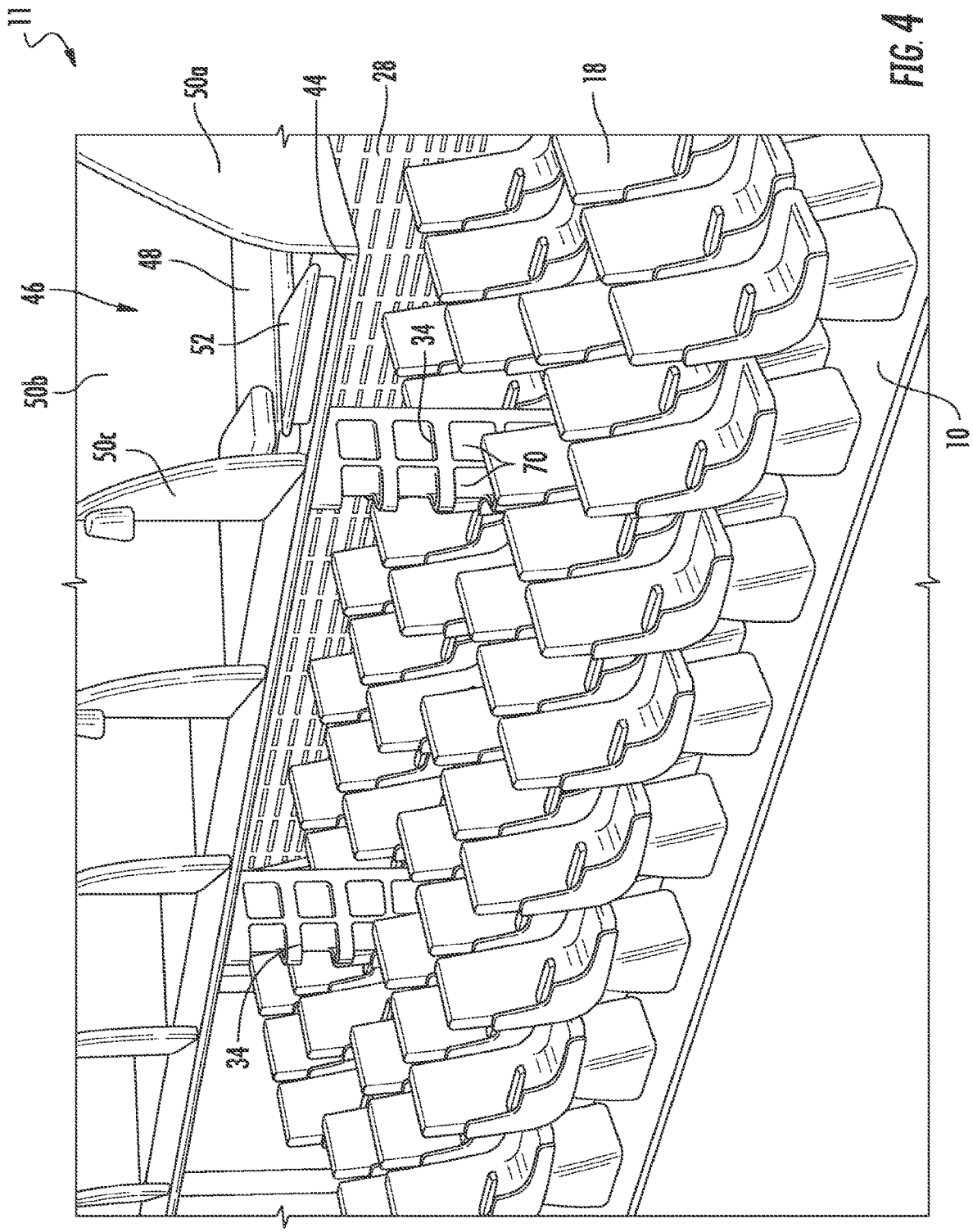
FIG. 4 shows a side perspective view of at least one example of a passenger seating deck and a passenger resting deck.

FIG. 4 illustrates a side perspective view of at least one example of the passenger seating deck 10 and the passenger resting deck 44 of the passenger aircraft 11. As illustrated, the passenger resting deck 44 is disposed above the passenger seating deck 10. The partition wall 28 is illustrated as separating the passenger seating deck 10. The passenger resting compartments 46 including the resting surfaces 48, the dividers 50, and the expansion areas 52 are also illustrated in this figure.

The passenger seating deck 10 includes the service columns 34 disposed among and between the passenger seats 18. In some examples, the service columns 34 can be installed in place of one or more passenger seats 18. The service columns 34 can extend from the floor of the passenger seating deck 10 to the ceiling of the passenger seating deck 10. In some examples, the service columns 34 are located throughout the passenger seating deck 10 (e.g., in the common areas 16).

Each service column 34 can include one or more compartments 70 for enabling convenient access for passengers in the passenger seating deck 10. In some examples, the compartments 70 can include doors to enclose items within the compartments 70. In some examples, the service columns 34 can function as self-serve vending machines. In this manner, the service columns 34 can include suitable electronic and mechanical mechanisms in order to take payment and allow access to purchased goods. For example, a user interface can be provided for interacting with a control module. Using the user interface, passengers can select which items and/or compartments 70 they would like to access and pay for such items and/or access to such compartments 70. Upon payment, the control module can make the selected item accessible to the passenger (e.g., by unlocking a compartment 70 or moving the item to a common accessible area of the service column 34). In some examples, the items available in the service column can include any suitable service or item typically available on flights (e.g., food, beverages, literature, electronic devices, electronic accessories, duty-free items, which can include the foregoing, and the like). In some examples, at least some of the items may be available to the passengers without payment. For example, newspapers may be available to all passengers. In some examples, at least some compartments 70 can include items requiring payment, while other compartments 70 can include items not requiring payment.

FIG. 5 illustrates a front perspective view of at least one example of the passenger seating deck 10 of the passenger aircraft 11. In the example illustrated in FIG. 5, the partition wall 28 is disposed at a position in the fuselage 12 that defines an perimeter aisle 72 or passenger access corridor. Thus, the perimeter aisle 72 is situated between the partition wall 28 and a side of the fuselage 12. Unlike the passenger aisles 24, the perimeter aisle 72 is adjacent to the fuselage 12 and separated from the passenger seating area 14. The perimeter aisle 72 may therefore be beneficial for passengers to move throughout the passenger aircraft 11 without impacting other passengers. For example, passengers can move between common areas, to lavatories, and the like without having to navigate the passenger aisles 24 that are bounded by passenger seats.

In some examples, the perimeter aisle 72 can include one or more shared seats 42 and moveable service carts 38. As illustrated in FIG. 5, the partition wall 28 can extend from the floor of the passenger seating deck 10 to the ceiling of the passenger seating deck 10. The partition wall 28 can be a continuous wall that does not include breaks or openings. In some examples, the partition wall 28 includes slits or opening 74 to allow light and air to move throughout the passenger aircraft 11. In some examples, the openings 74 can be larger than illustrated and placed near the passengers' feet in order to provide additional space for movement of the passengers' feet when seated in the passenger seats 18. In other examples, the openings 74 can be large enough to allow a passenger to pass through. In this manner, the openings 74 can function as access points for moving width-wise across the passenger aircraft 11. The partition wall 28 can be made up of multiple separate sections. In this example, the different sections can be spaced such that passengers can pass between the different sections. The partition wall 28 can also be made of multiple sections spaced such that passengers cannot pass between the multiple sections. In some examples, the partition wall 28 can include padding or other upholstery to make leaning against the partition wall 28 by seated passengers more comfortable.

In some examples, the partition wall 28 has acoustic properties. For example, the partition wall 28 can function to impede noise coming from the engines of the passenger aircraft 11. In other examples, the partition wall 28 can function to impede noise coming from a common area or galley area where passengers and/or crew may congregate. In a particular example, two partition walls 28 may be included in the passenger aircraft 11 and positioned in a manner that creates a class of passenger seats that are quieter than others. This may be because these passenger seats are located between the two partition walls 28. The partition wall 28 can also be used to display advertising for the airline and/or for other suitable advertisers (e.g., for a food item sold on the passenger aircraft).

The partition wall 28 can be formed of any suitable material including but not limited to aluminum, stainless steel, aramid fibers, polycarbonate, polypropylene, other metallic materials, composite materials, glass, or other similar materials. The partition wall 28 can include regions that are transparent, translucent, and/or opaque. For example, the partition wall 28 can include one or more regions formed of glass that can include active glass subregions. These active glass subregions can be locations where the transparency of the glass can be altered. For example, the regions can be current controlled.

Figure 6A:
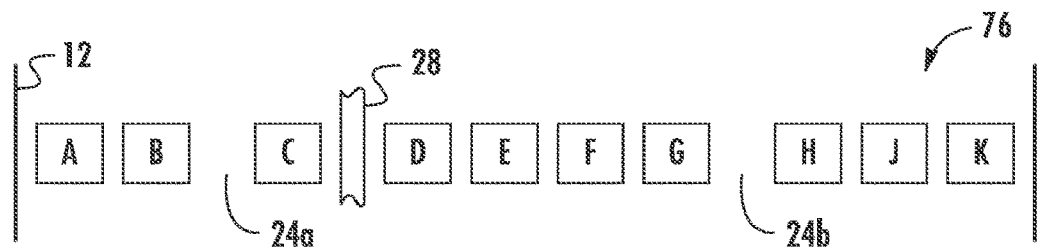
FIG. 6A shows at least one example of a row of passenger seats in a seating accommodation system.
Figure 6B:
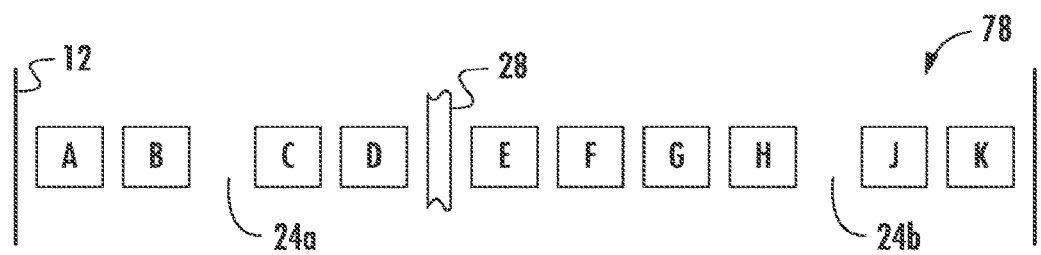
FIG. 6B shows at least one example of a row of passenger seats in a seating accommodation system.
Figure 6C:
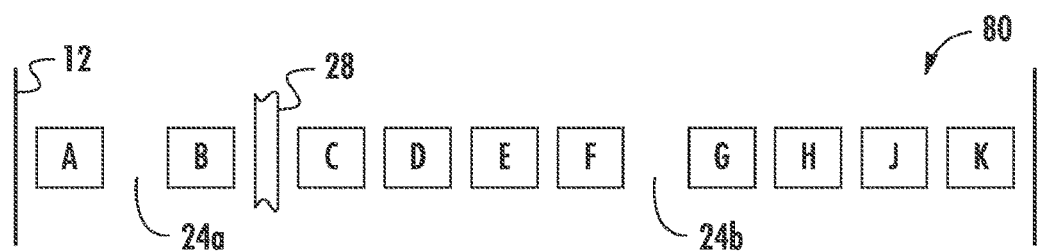
FIG. 6C shows at least one example of a row of passenger seats in a seating accommodation system.
Figure 6D:
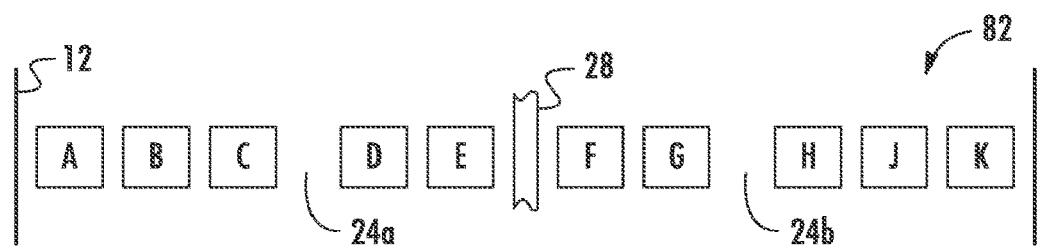
FIG. 6D shows at least one example of a row of passenger seats in a seating accommodation system.
Figure 6E:
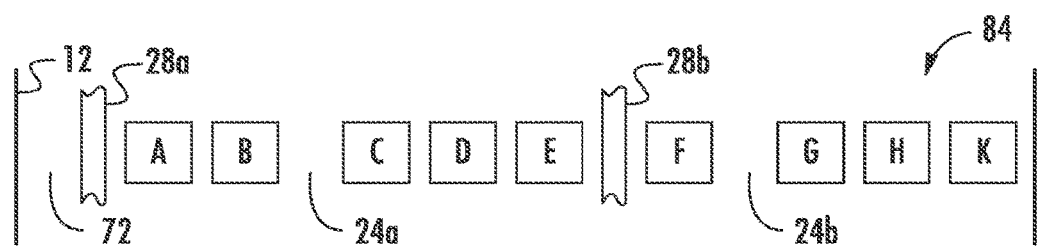
FIG. 6E shows at least one example of a row of passenger seats in a seating accommodation system.
Figure 6F:
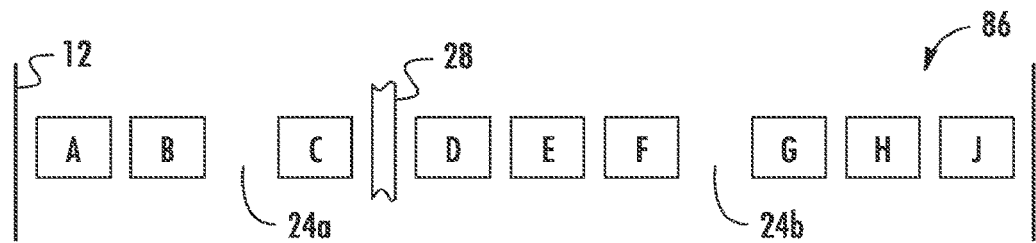
FIG. 6F shows at least one example of a row of passenger seats in a seating accommodation system.
Figure 6G:
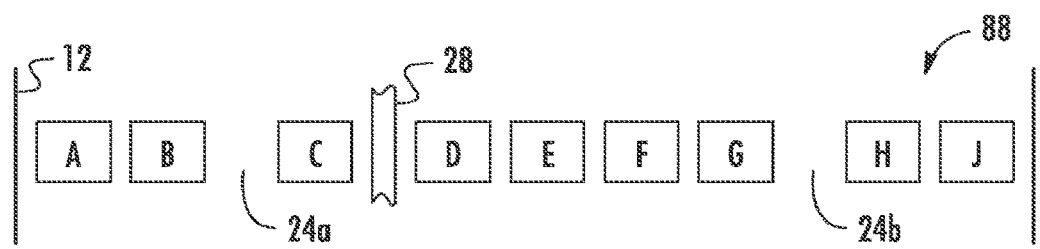
FIG. 6G shows at least one example of a row of passenger seats in a seating accommodation system.
Figure 6H:
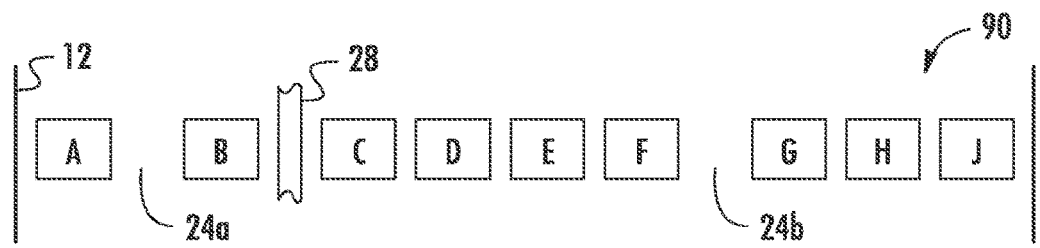
FIG. 6H shows at least one example of a row of passenger seats in a seating accommodation system.
Figure 6I:
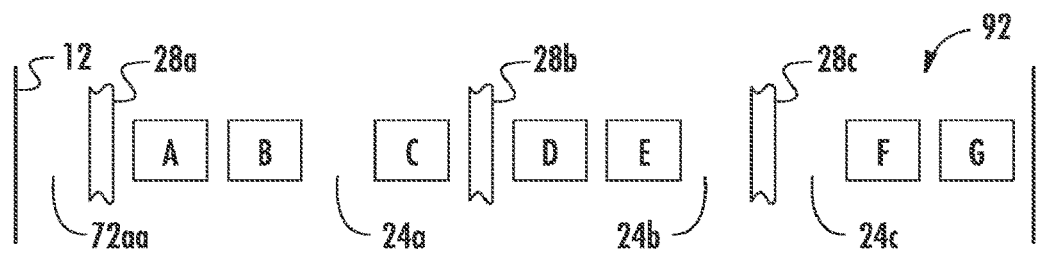
FIG. 6I shows at least one example of a row of passenger seats in a seating accommodation system.

FIGS. 6A-6I illustrate example passenger seat row layouts 76-92 in connection with one or more partition walls 28. FIG. 6A illustrates the passenger seat row layout 76 that includes the partition wall 28 disposed between passenger seats C and D to create a 2×1×4×3 layout. FIG. 6B illustrates the passenger seat row layout 78 that includes the partition wall 28 disposed between passenger seats D and E to create a 2×2×4×2 layout. FIG. 6C illustrates the passenger seat row layout 80 that includes the partition wall 28 disposed between passenger seats B and C to create a 1×1×4×4 layout. FIG. 6D illustrates the passenger seat row layout 82 that includes the partition wall 28 disposed between passenger seats E and F to create a 3×2×2×3 layout. FIG. 6E illustrates the passenger seat row layout 84 that includes the partition wall 28a disposed between a wall of the fuselage 12 and seat A and the partition wall 28b disposed between seats E and F to create a 2×3×1×3 layout. The passenger seat row layout 84 also includes the perimeter aisle 72. FIG. 6F illustrates the passenger seat row layout 86 that includes the partition wall 28 disposed between passenger seats C and D to create a 2×1×3×3 layout. FIG. 6G illustrates the passenger seat row layout 88 that includes the partition wall 28 disposed between passenger seats C and D to create a 2×1×4×2 layout. FIG. 6H illustrates the passenger seat row layout 90 that includes the partition wall 28 disposed between passenger seats B and C to create a 1×1×4×3 layout. FIG. 6I illustrates the passenger seat row layout 92 that includes the partition wall 28a disposed between a first wall of the fuselage 12 and the passenger seat A, the partition wall 28b disposed between the passenger seats C and D, and the partition wall 28c disposed between the passenger aisles 24b and 24c to create a 2×1×2×2 layout. While a few example seat row layouts have been discussed with reference to FIGS. 6A-6I, it should be understood that this disclosure includes other example configurations including greater or fewer passenger seats and greater or fewer partition walls.

Figure 7:
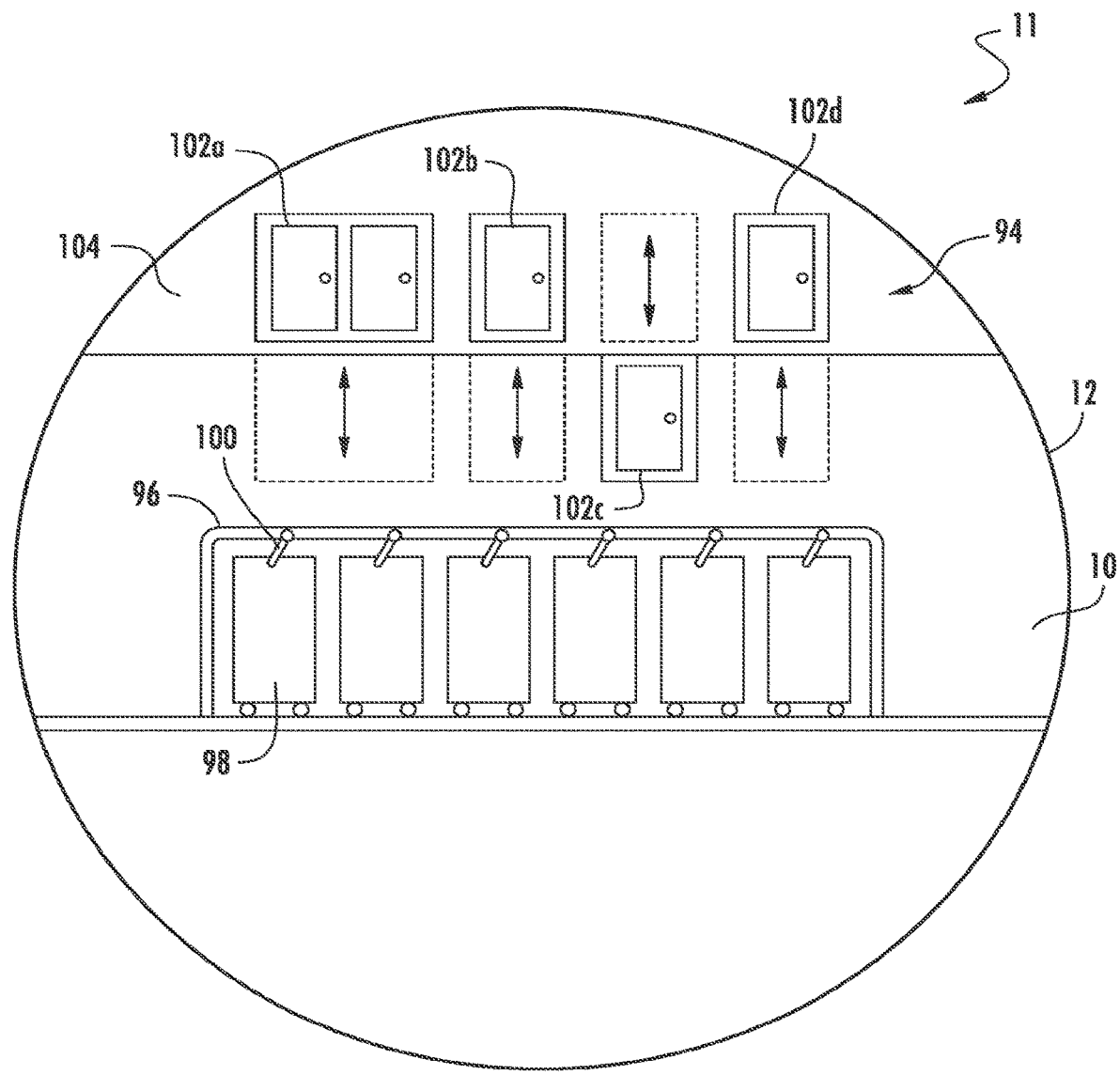
FIG. 7 shows a front view of at least one example of a deployable galley system.
Figure 8:
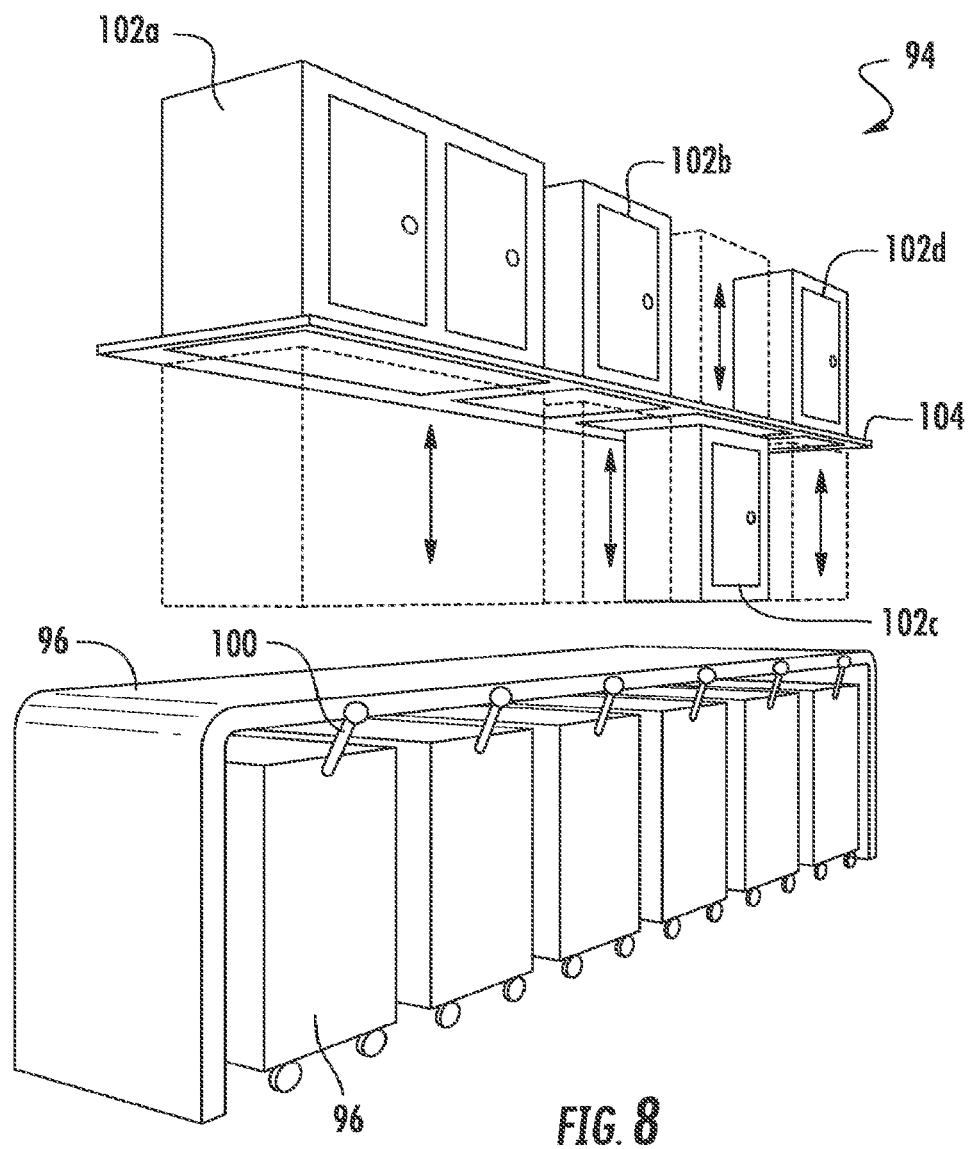
FIG. 8 shows a side perspective view of at least one example of the deployable galley system of FIG. 7.

FIG. 7 illustrates a front view of at least one example of a deployable galley system 94 that can be situated on the passenger seating deck 10 of the passenger aircraft 11. FIG. 8 illustrates a side perspective view of the deployable galley system 94 of FIG. 7. The deployable galley system 94 can be implemented at the galleys 40. The deployable galley system 94 can include a horizontal surface 96 below which can be retained one or more galley carts 98. Each galley cart 98 can be stowed below the horizontal surface 96 and held in place using a latching mechanism 100 or other suitable structure. The galley carts 98 may be removed from the their stowed locations and moved throughout the cabin of the passenger aircraft 12 by crew members. In some examples, the moveable service carts 38 are stowed below the horizontal surface 96 adjacent to the galley carts 98.

The deployable galley system 94 can also include one or more deployable galley cabinets 102. As illustrated, the deployable galley cabinets 102 are configured to move from a deployed position (e.g., the deployable galley cabinet 102c) below an upper portion 104 of the fuselage 12 to a stowed position (e.g., the deployable galley cabinets 102a, 102b, and 102d) above and/or within the upper portion 104. The deployable galley system 94 can include any suitable mechanism configured to facilitate the deployment of the deployable galley cabinets 102. For example, the deployable galley cabinets 102 can each be attached to a linear actuator, counterweight, spring system, gas-filled piston assembly, and/or any other suitable mechanism to facilitate movement of the deployable galley cabinets 102. In some examples, the deployable galley cabinets 102 move up and down along a set of tracks attached to a rear wall of the galley 40. As illustrated, the deployable galley cabinets 102 can be variously sized and can move up and down independent of each other. The movement can be considered an orthogonal movement relative to the longitudinal axis of the fuselage 12. In some examples, the deployable galley system 94 is positioned at a location on the passenger seating deck 10 so as to not be below the passenger resting deck 44. In this manner, the deployable galley cabinets 102 can move up into the space generally occupied by the passenger resting deck 44.

Unlike conventional galleys, the deployable galley system 94 provides for both storage in the deployable galley cabinets 102 and horizontal flat space (e.g., the horizontal surface 96). For example, when the deployable galley cabinets 102 are in their stowed positions, the horizontal flat space can be used for any suitable purpose (e.g., food preparation by crew members, entertainment purposes, as a bar for serving drinks, etc.).

Figure 9A:
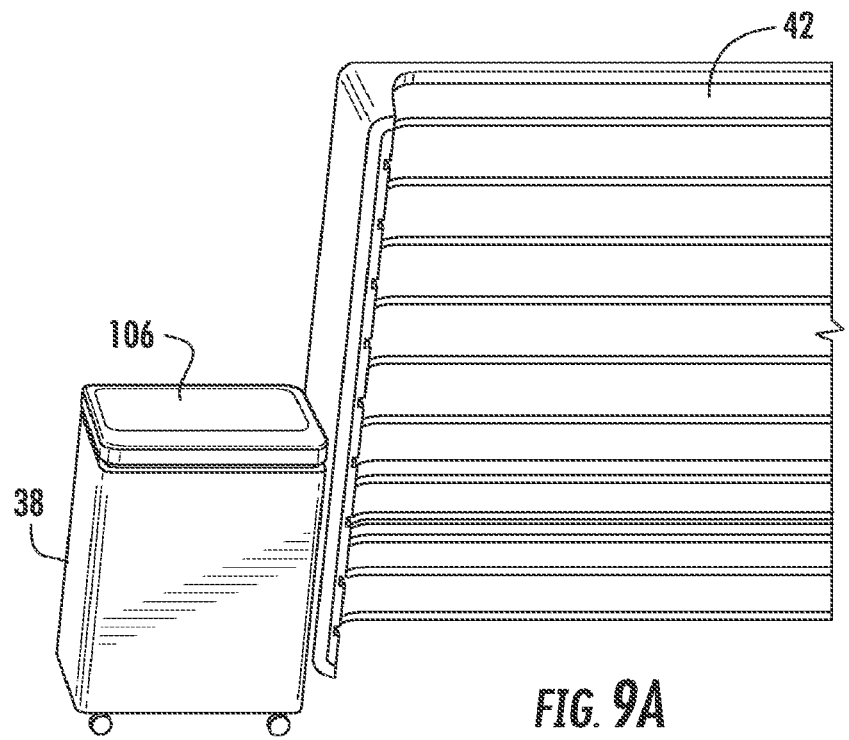
FIG. 9A shows a front perspective view of at least one example of a moveable service cart with a deployable structure in a stowed position.
Figure 9B:
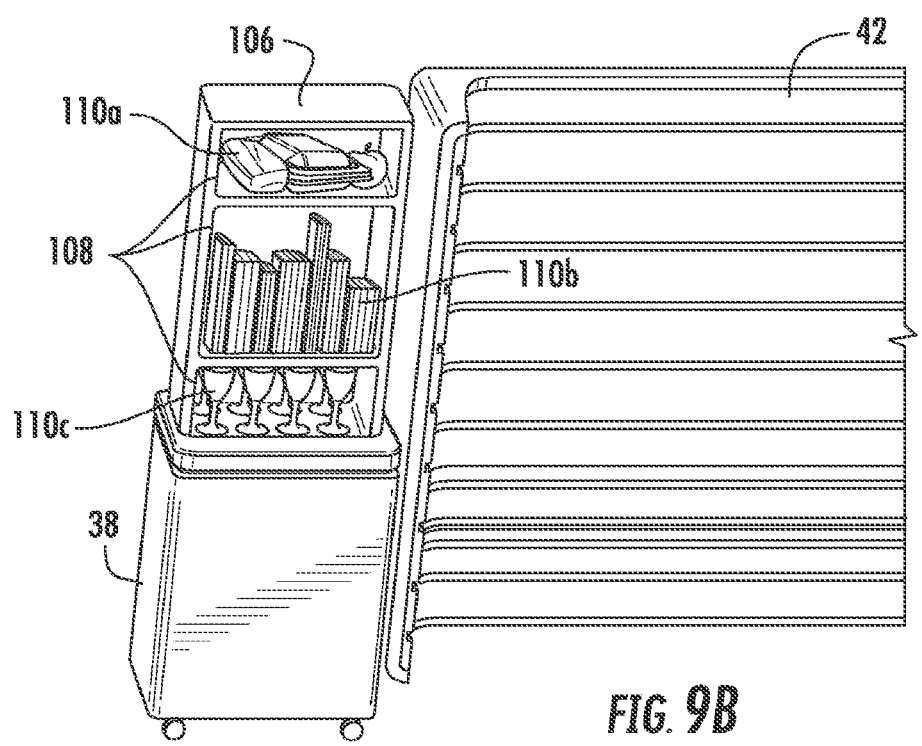
FIG. 9B shows a front perspective view of at least one example of the moveable service cart of FIG. 9A with the deployable structure in a deployed position.

There may also be provided a moveable service cart 38 having deployable features. FIG. 9A illustrates a front perspective view of at least one example of the moveable service cart 38 with a deployable structure 106 in a stowed position. FIG. 9B illustrates a front perspective view of at least one example of the moveable service cart 38 with the deployable structure 106 in a deployed position. The moveable service cart 38 can be releasably secured to one of the service anchors 36 on the passenger seating deck 10 of the passenger aircraft 11. For example, one of the service anchors 36 can be situated adjacent the shared seat 42 and the moveable service cart 38 can releasably secured adjacent to the shared seat 42. In some examples, the moveable service carts 38 can also be used by the flight crew as the galley carts 98 are typically used. For example, a crew member can push the moveable service cart 38 down the aisles The deployable structure 106 of the moveable service cart 38 can function to move from the stowed position in FIG. 9A to the deployed position in FIG. 9B. The deployable structure 106 can include any suitable structure and/or devices to enable the deployable structure 106 to move up and down. For example, the deployable structure can include a push-click structure, an electrically controlled motor or actuator, a handle for manually pulling out and pushing in the deployable structure, a spring-loaded structure, and any other suitable structure or device.

Movement of the deployable structure 106 may be desirable for stowing the moveable service cart 38 during taxi, takeoff, and landing of the passenger aircraft 11. For example, the deployable structure 106 may be moved to the stowed position when the moveable service cart 38 is rolled or otherwise moved between the service anchor 36 and the stowage location (e.g., together with the galley carts 98 or at some other location). When the moveable service cart 38 has been secured to the service anchor 36, the deployable structure 106 can be deployed to reveal one or more compartments 108 of the deployable structure 106.

The one or more compartments 108 may be dimensioned to received various items 110 available for purchase or use by the passengers of the passenger aircraft 12. In the stowed position, the one or more compartments 108 can be within the moveable service cart 38 or otherwise inaccessible to the passengers. In the deployed position, the one or more compartments 108 can be outside the moveable service cart 39 or otherwise accessible to the passengers.

Similar items can be stowed in the one or more compartments 108 as in the one or more compartments 70 of the service columns 34. In some examples, the compartments 108 can include doors to enclose items within the compartments 108. Like the service columns 34, the moveable service cart 38 can function as a self-serve vending machine. In some examples, the moveable service cart 38 can include one or more dispensers to dispense coffee, hot and cold water, soda, juice, and the like. In some examples, the deployable structure 106 and/or the moveable service cart 38 can include advertising relating to the items or services available in connection with the moveable service cart 38. For example, the moveable service cart 38 can be used to dispense coffee sold by a particular company and the company's logo can be placed on an exterior surface of the deployable structure 106.

In the following, further examples are described to facilitate the understanding of the invention: any of the preceding or subsequent examples:

Example 1

In this example, there is provided A passenger accommodation system, comprising: a passenger seating deck disposed within a fuselage of an aircraft, the passenger seating deck comprising: a passenger seating area and one or more common areas, the fuselage having a longitudinal axis extending in the direction of travel of the aircraft; a plurality of passenger seats disposed within the passenger seating deck in the passenger seating area, the plurality of passenger seats arranged in a set of rows and a set of columns, at least some columns of the set of columns aligned with the longitudinal axis; a partition wall disposed within the passenger seating deck and extending between the plurality of passenger seats to define a first passenger seating subarea and a second passenger seating subarea; one or more service anchors disposed within the one or more common areas, each service anchor configured to releasably secure a moveable service cart, the moveable service cart comprising a deployable structure that is configured to move from a stowed position within the moveable service cart to a deployed position outside of the moveable service cart; and a deployable galley system disposed within one of the one or more common areas, the deployable galley system comprising one or more galley cabinets each configured to move in a direction orthogonal to the longitudinal direction between a stowed position and a deployed position; and a passenger resting deck disposed within the fuselage at a location above the passenger seating deck, the passenger resting deck comprising: an access aisle aligned with the longitudinal axis; and a plurality of resting compartments, individual resting compartments of the plurality of resting compartments aligned with an oblique angle relative to the longitudinal axis, each resting compartment comprising: a resting surface; and a set of dividers extending between the resting surface and an upper portion of the fuselage.

Example 2

In this example, there is provided a passenger accommodation system, comprising: a passenger seating deck disposed within a fuselage of an aircraft, the passenger seating deck defined by a floor and a ceiling, the fuselage having a longitudinal axis extending in the direction of travel of the aircraft; a plurality of passenger seats disposed within the passenger seating deck, the plurality of passenger seats arranged in a set of rows and a set of columns, at least some columns of the set of columns aligned with the longitudinal axis; a partition wall disposed within the passenger seating deck to define a first area and a second area, a set of passenger seats of the plurality of passenger seats disposed within at least the first area; a first passenger aisle disposed within the first area; and a second passenger aisle disposed within the second area, wherein passengers of the aircraft can move between the first area and the second area using at least one of the first passenger aisle or the second passenger aisle.

Example 3

In this example, there is provided a passenger accommodation system of any of the preceding or subsequent examples, wherein the partition wall comprises a curved portion and a straight portion, the straight portion being aligned with the longitudinal axis and the curved portion curving relative to the longitudinal axis.

Example 4

In this example, there is provided a passenger accommodation system of any of the preceding or subsequent examples, wherein the set of passenger seats is a first set of passenger seats, and wherein a second set of passenger seats of the plurality of passenger seats is disposed within the second area.

Example 5

In this example, there is provided a passenger accommodation system of any of the preceding or subsequent examples, wherein the second passenger aisle is defined by the partition wall on a first side and the fuselage on a second side.

Example 6

In this example, there is provided a passenger accommodation system of any of the preceding or subsequent examples, further comprising a passenger resting deck disposed within the fuselage of the aircraft at a position above the passenger seating deck.

Example 7

In this example, there is provided a passenger accommodation system of any of the preceding or subsequent examples, wherein the passenger resting deck comprises: an access aisle extending along the longitudinal axis and a plurality of resting compartments, individual resting compartments of the plurality of resting compartments aligned with an oblique angle relative to the longitudinal axis, each resting compartment comprising: a resting surface; and a set of dividers extending between the resting surface and an upper portion of the fuselage.

Example 8

In this example, there is provided a passenger accommodation system of any of the preceding or subsequent examples, wherein the passenger resting deck is a first passenger resting deck, the passenger accommodation system further comprising a second passenger resting deck disposed within the fuselage of the aircraft at a position below the passenger seating deck.

Example 9

In this example, there is provided a passenger accommodation system of any of the preceding or subsequent examples, further comprising a passenger resting deck disposed within the fuselage of the aircraft at a position below the passenger seating deck, the passenger resting deck comprising: an access aisle extending along the longitudinal axis; and a plurality of resting compartments each extending in a direction orthogonal to the longitudinal axis.

Example 10

In this example, there is provided an aircraft comprising: a passenger seating deck disposed within a fuselage of the aircraft, the fuselage having a longitudinal axis extending in the direction of travel of the aircraft; a plurality of passenger seats disposed within the passenger seating deck, the plurality of passenger seats arranged in a set of rows and a set of columns, at least some columns of the set of columns aligned with the longitudinal axis; and a partition wall disposed within the passenger seating deck to separate a first set of passenger seats of the plurality of passenger seats and a second set of passenger seats of the plurality of passenger seats, at least a portion of the partition wall aligned with the longitudinal axis, wherein passengers of the aircraft can move between the first set of passenger seats and the second set of passenger seats.

Example 11

In this example, there is provided an aircraft of any of the preceding or subsequent examples, wherein the portion of the partition wall is a first portion, and wherein the partition wall further comprises: a second portion that extends in a direction orthogonal to the longitudinal axis; and a third portion that curvedly attaches the first portion and the second portion.

Example 12

In this example, there is provided an aircraft of any of the preceding or subsequent examples, wherein the passenger seating deck is defined by a floor and a ceiling, and wherein the partition wall extends between the floor and the ceiling.

Example 13

In this example, there is provided an aircraft of any of the preceding or subsequent examples, wherein the partition wall is a first partition wall, and wherein the aircraft further comprises a second partition wall disposed within the passenger seating deck to separate a passenger access corridor and the second set of passenger seats.

Example 14

In this example, there is provided an aircraft of any of the preceding or subsequent examples, wherein the partition wall comprises one or more openings.

Example 15

In this example, there is provided a passenger accommodation system, comprising: a passenger seating deck disposed within a fuselage of an aircraft, the passenger seating deck comprising a seating area and one or more common areas; a plurality of passenger seats disposed within the seating area of the passenger seating deck; and one or more service anchors disposed within the one or more common areas, each service anchor configured to releasably secure a moveable service cart, the moveable service cart comprising a deployable structure that is configured to move from a stowed position within the moveable service cart to a deployed position outside of the moveable service cart.

Example 16

In this example, there is provided a passenger accommodation system of any of the preceding or subsequent examples, further comprising a plurality of fixed service columns disposed within the seating area and among the plurality of passenger seats.

Example 17

In this example, there is provided a passenger accommodation system of any of the preceding or subsequent examples, wherein the plurality of fixed service columns extend between a floor of the passenger seating deck and a ceiling of the passenger seating deck.

Example 18

In this example, there is provided a passenger accommodation system o of any of the preceding or subsequent examples, wherein at least one fixed service column of the plurality of fixed service columns comprises one or more compartments dimensioned to receive items that are available for use by the passengers or are available for purchase by the passengers.

Example 19

In this example, there is provided a passenger accommodation system of any of the preceding or subsequent examples, wherein the deployable structure of the moveable service cart comprises one or more compartments that are accessible in the deployed position and inaccessible in the stowed position.

Example 20

In this example, there is provided a passenger accommodation system of any of the preceding or subsequent examples, further comprising a deployable galley system disposed in at least one of the one or more common areas.

Example 21

In this example, there is provided a passenger accommodation system of any of the preceding or subsequent examples, wherein the deployable galley system comprises one or more galley cabinets each configured to move in a direction orthogonal to the longitudinal direction between a stowed position and a deployed position.

Spatially relative terms, such as "below", "above", "lower", "upper" and the like may be used above to describe an element and/or feature's relationship to another element(s) and/or feature(s) as, for example, illustrated in the figures. It will be understood that the spatially relative terms are intended to encompass different orientations of the systems in use and/or operation in addition to the orientation depicted in the figures. For example, if the systems in the figures are turned over, elements described as "below" and/or "beneath" other elements or features would then be oriented "above" the other elements or features. The systems may be otherwise oriented (e.g., rotated 90 degrees or at other orientations) and the spatially relative descriptors used herein interpreted accordingly.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A passenger accommodation system, comprising:
a passenger seating deck disposed within a fuselage of an aircraft, the passenger seating deck comprising:
a passenger seating area and one or more common areas, the fuselage having a longitudinal axis extending in the direction of travel of the aircraft;
a plurality of passenger seats disposed within the passenger seating deck in the passenger seating area, the plurality of passenger seats arranged in a set of rows and a set of columns, at least some columns of the set of columns aligned with the longitudinal axis;
a first partition wall substantially aligned with the longitudinal axis and disposed within the passenger seating deck, the first partition wall extending between the plurality of passenger seats to define a first passenger seating subarea and a second passenger seating subarea;
a second partition wall;
a perimeter aisle which is defined by the second partition wall on one side and by the fuselage on the other side, and which is separated from the passenger seating area by the second partition wall;
one or more service anchors disposed within the one or more common areas, each service anchor configured to releasably secure a moveable service cart, the moveable service cart comprising a deployable structure that is configured to move from a stowed position within the moveable service cart to a deployed position outside of the moveable service cart; and
a deployable galley system disposed within one of the one or more common areas, the deployable galley system comprising one or more galley cabinets each configured to move in a direction orthogonal to the longitudinal direction between a stowed position and a deployed position; and
a passenger resting deck disposed within the fuselage at a location above the passenger seating deck, the passenger resting deck comprising:
an access aisle aligned with the longitudinal axis; and
a plurality of resting compartments, individual resting compartments of the plurality of resting compartments aligned with an oblique angle relative to the longitudinal axis, each resting compartment comprising:
a resting surface; and
a set of dividers extending between the resting surface and an upper portion of the fuselage.

2. The passenger accommodation system of claim 1, wherein the first partition wall comprises a curved portion and a straight portion, the straight portion being substantially aligned with the longitudinal axis and the curved portion curving relative to the longitudinal axis.

3. A passenger accommodation system, comprising:
a passenger seating deck disposed within a fuselage of an aircraft, the passenger seating deck defined by a floor and a ceiling, the fuselage having a longitudinal axis extending in the direction of travel of the aircraft;
a plurality of passenger seats disposed within the passenger seating deck, the plurality of passenger seats arranged in a set of rows and a set of columns, at least some columns of the set of columns aligned with the longitudinal axis;
a partition wall substantially aligned with the longitudinal axis and disposed within the passenger seating deck to define a first area and a second area, a set of passenger seats of the plurality of passenger seats disposed within at least the first area;
a first passenger aisle disposed within the first area; and
a second passenger aisle disposed within the second area, wherein the second passenger aisle is defined by the partition wall on a first side and by the fuselage on a second side, and wherein passengers of the aircraft can move between the first area and the second area using at least one of the first passenger aisle or the second passenger aisle.

4. The passenger accommodation system of claim 3, wherein the partition wall comprises a curved portion and a straight portion, the straight portion being substantially aligned with the longitudinal axis and the curved portion curving relative to the longitudinal axis.

5. The passenger accommodation system of claim 3, further comprising a passenger resting deck disposed within the fuselage of the aircraft at a position above the passenger seating deck.

6. The passenger accommodation system of claim 5, wherein the passenger resting deck comprises:
an access aisle extending along the longitudinal axis; and
a plurality of resting compartments, individual resting compartments of the plurality of resting compartments aligned with an oblique angle relative to the longitudinal axis, each resting compartment comprising:
a resting surface; and
a set of dividers extending between the resting surface and an upper portion of the fuselage.

7. The passenger accommodation system of claim 5, wherein the passenger resting deck is a first passenger resting deck, the passenger accommodation system further comprising a second passenger resting deck disposed within the fuselage of the aircraft at a position below the passenger seating deck.

8. The passenger accommodation system of claim 3, further comprising a passenger resting deck disposed within the fuselage of the aircraft at a position below the passenger seating deck, the passenger resting deck comprising:
an access aisle extending along the longitudinal axis; and
a plurality of resting compartments each extending in a direction orthogonal to the longitudinal axis.

9. An aircraft, comprising:
a passenger seating deck disposed within a fuselage of the aircraft, the fuselage having a longitudinal axis extending in the direction of travel of the aircraft;
a plurality of passenger seats disposed within the passenger seating deck, the plurality of passenger seats arranged in a set of rows and a set of columns, at least some columns of the set of columns aligned with the longitudinal axis;
a first partition wall disposed within the passenger seating deck to separate a first set of passenger seats of the plurality of passenger seats and a second set of passenger seats of the plurality of passenger seats, at least a portion of the first partition wall substantially aligned with the longitudinal axis, wherein passengers of the aircraft can move between the first set of passenger seats and the second set of passenger seats;
a second partition wall disposed within the passenger seating deck; and
a passenger access corridor that is defined by the second partition wall on one side and by the fuselage on the other side, and which is separated from the second set of passenger seats by the second partition wall.

10. The aircraft of claim 9, wherein the portion of the first partition wall is a first portion, and wherein the first partition wall further comprises:
a second portion that extends along an axis that is different from the longitudinal axis; and
a third portion that curvedly attaches the first portion and the second portion.

11. The aircraft of claim 9, wherein the passenger seating deck is defined by a floor and a ceiling, and wherein at least one of the first partition wall or the second partition wall extends between the floor and the ceiling.

12. The aircraft of claim 9, wherein at least one of the first partition wall or the second partition wall comprises one or more openings.

13. A passenger accommodation system, comprising:
a passenger seating deck disposed within a fuselage of an aircraft, the passenger seating deck comprising (i) a seating area, (ii) a galley area, and (iii) one or more common areas, the one or more common areas being distinct from the galley area;
a plurality of passenger seats disposed within the seating area of the passenger seating deck; and
a shared seat including a seatbelt disposed within the one or more common areas, the shared seat configured for sharing by different passengers of the aircraft; and
one or more service anchors disposed within the one or more common areas adjacent to the shared seat, each service anchor configured to releasably secure a moveable service cart to at least one of a floor of the fuselage or a wall of the fuselage, the moveable service cart comprising a deployable structure that is configured to move from a stowed position within the moveable service cart to a deployed position outside of the moveable service cart.

14. The passenger accommodation system of claim 13, further comprising a plurality of fixed service columns disposed within the seating area and among the plurality of passenger seats.

15. The passenger accommodation system of claim 14, wherein the plurality of fixed service columns extend between the floor of the passenger seating deck and a ceiling of the passenger seating deck.

16. The passenger accommodation system of claim 14, wherein at least one fixed service column of the plurality of fixed service columns comprises one or more compartments dimensioned to receive items that are available for use by passengers or are available for purchase by the passengers.

17. The passenger accommodation system of claim 13, wherein the deployable structure of the moveable service cart comprises one or more compartments that are accessible in the deployed position and inaccessible in the stowed position.

18. The passenger accommodation system of claim 13, further comprising a deployable galley system disposed in at least one of the one or more common areas.

19. The passenger accommodation system of claim 18, wherein the deployable galley system comprises one or more galley cabinets each configured to translate in a vertical direction orthogonal to a longitudinal axis of the fuselage between a stowed position and a deployed position.

20. The passenger accommodation system of claim 13, further comprising a partition wall that is substantially aligned with a longitudinal axis of the fuselage, the partition wall extending within the passenger seating deck to define a first passenger seating subarea and a second passenger seating subarea, and wherein the plurality of passenger seats is disposed within the first passenger seating subarea and the second passenger seating subarea.

21. The passenger accommodation system of claim 13, wherein each service anchor of the one or more service anchors comprises a belt to releasably couple with the moveable service cart or a magnet to releasably couple with the moveable service cart.

\* \* \* \* \*